(12) United States Patent
Hoang

(10) Patent No.: US 8,090,988 B2
(45) Date of Patent: Jan. 3, 2012

(54) SAVING INFORMATION TO FLASH MEMORY DURING POWER FAILURE

(75) Inventor: Phan Hoang, Placentia, CA (US)

(73) Assignee: Virtium Technology, Inc., Rancho Santa Margarita, CA (US)

(*) Notice: Subject to any disclaimer, the term of this patent is extended or adjusted under 35 U.S.C. 154(b) by 65 days.

(21) Appl. No.: 12/625,422

(22) Filed: Nov. 24, 2009

(65) Prior Publication Data

US 2011/0126046 A1   May 26, 2011

(51) Int. Cl.
*G06F 11/00* (2006.01)
(52) U.S. Cl. .................. 714/22; 714/41; 714/42
(58) Field of Classification Search .......... 714/30–37, 714/39, 41, 22
See application file for complete search history.

(56) References Cited

U.S. PATENT DOCUMENTS

| 5,894,413 A * | 4/1999 | Ferguson ................ 363/65 |
| 6,084,813 A * | 7/2000 | Kikuchi et al. ............ 365/222 |
| 2009/0323452 A1* | 12/2009 | Cagno et al. ............. 365/227 |

* cited by examiner

*Primary Examiner* — Dieu-Minh Le
(74) *Attorney, Agent, or Firm* — Blakely, Sokoloff, Taylor & Zafman LLP

(57) ABSTRACT

An embodiment is a method and apparatus to save data during power failure. A power supply generator generates operating voltages to a circuit from a generator supply source. A power monitor monitors a normal supply voltage and a backup supply voltage to provide a normal supply voltage to the generator supply source in a normal mode and to provide a backup supply voltage to the generator supply source in a power failure mode. A data transfer circuit transfers data from a volatile memory in the circuit to a non-volatile memory during the power failure mode.

30 Claims, 6 Drawing Sheets

SAVING INFORMATION TO FLASH MEMORY DURING POWER FAILURE

TECHNICAL FIELD

The presently disclosed embodiments are directed to the field of integrated circuits, and more specifically, to memory systems.

BACKGROUND

Power failure is a major problem in microprocessor-based systems. A power outage such as drop-out, brown-out, or blackout, may cause momentary or long-term loss of power and may occur unpredictably. When the power to the system is turned off, either accidentally or due to a power outage, critical information contained in volatile memory may be lost.

Existing techniques to protect data during a power failure have a number of drawbacks. Typical techniques employ battery backup memory modules. Data are stored in these memory backup modules and battery is used to provide power to these memory modules during loss of power. A major disadvantage of this technique is the cost of the battery. In addition, complex circuitries are used to support the battery-operated mode. Furthermore, battery life may be degraded for extended use and replacement of batteries may be expensive.

SUMMARY

One disclosed feature of the embodiments is a method and apparatus to save information during power failure. A power supply generator generates operating voltages to a circuit from a generator supply source. A power monitor monitors a normal supply voltage and a backup supply voltage to provide a normal supply voltage to the generator supply source in a normal mode and to provide a backup supply voltage to the generator supply source in a power failure mode. A data transfer circuit transfers data from a volatile memory in the circuit to a non-volatile memory during the power failure mode.

BRIEF DESCRIPTION OF THE DRAWINGS

Embodiments may best be understood by referring to the following description and accompanying drawings that are used to illustrate embodiments. In the drawings.

DETAILED DESCRIPTION

Figure 1:
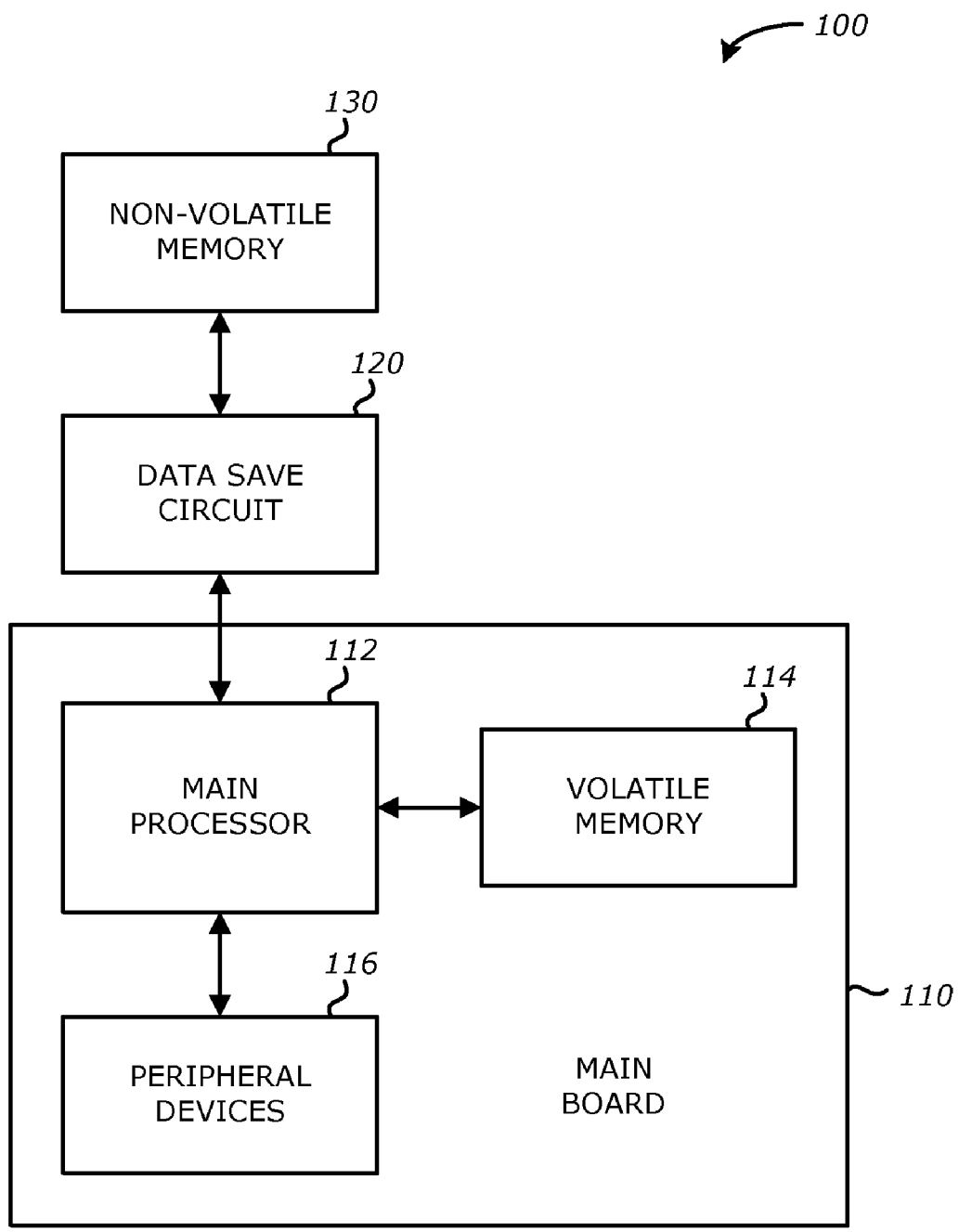
FIG. 1 is a diagram illustrating a system according to one embodiment.

One disclosed feature of the embodiments is a technique to save information during power failure. A power supply generator generates operating voltages to a circuit from a generator supply source. A power monitor monitors a normal supply voltage and a backup supply voltage to provide a normal supply voltage to the generator supply source in a normal mode and to provide a backup supply voltage to the generator supply source in a power failure mode. A data transfer circuit transfers data from a volatile memory in the circuit to a non-volatile memory during the power failure mode.

In the following description, numerous specific details are set forth. However, it is understood that embodiments may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

One disclosed feature of the embodiments is a technique to save information from volatile memory during a power failure. The information includes any contents in the volatile memory. A power supply generator generates operating voltages to a circuit from a generator supply source. A power monitor monitors a normal supply voltage and a backup supply voltage to provide a normal supply voltage to the generator supply source in a normal mode and to provide a backup supply voltage to the generator supply source in a power failure mode. A data transfer circuit transfers data from a volatile memory in the circuit to a non-volatile memory during the power failure mode. The normal mode operates when the normal supply voltage is greater than or equal to the backup supply voltage and the power failure mode operates when the normal supply voltage is less than the backup supply voltage. The normal supply voltage is provided by a normal power circuit and the backup supply voltage is provided by a backup power circuit. The normal power circuit operates during the normal mode. The backup power circuit includes a charging circuit and a charge element. The charging circuit receives power from the normal power circuit to provide a charging current to the charge element during the normal mode. The charge element receives the charging current and provides the backup supply voltage in the power failure mode.

The power monitor includes a load sharing circuit and a comparator. The load sharing circuit allows the load to be shared by the normal supply voltage and the backup supply voltage to continuously provide the generator supply source to the power supply generator. The comparator compares the normal supply voltage and the backup supply voltage to determine when there is a power failure. It generates a power failure indicator to the data transfer circuit when this occurs.

The data transfer circuit initiates transferring data from the volatile memory to the non-volatile memory when the power failure indicator is asserted. The data transfer circuit includes a transfer processor and a switching circuit. The transfer processor may be a programmable processor that may execute a program to perform data transfers upon receiving the power failure indicator. The switching circuit switches bus signals between the transfer processor and a main processor to and from the volatile memory.

FIG. 1 is a diagram illustrating a system 100 according to one embodiment. The system 100 includes a main board 110, a data save circuit 120, and a non-volatile memory 130.

The main board 110 may be a motherboard of a system. It may include a main processor 112, a volatile memory 114, and peripheral devices 116. The main processor 112 may be any processor that has access to the volatile memory 114. The volatile memory 114 may contain data or instructions for the main processor 112. In one embodiment, the volatile memory may include DDR SDRAM, DDR2 SDRAM, DDR3 SDRAM, DDR4 SDRAM, or any other compatible memory modules. Any JEDEC compatible DRAM modules may be used such as unbuffered, registered, fully buffered (FB), very low profile (VLP), micro-, and mini-DIMM.

The data save circuit 120 may be located on a separate board which is connected to the main board 110 via an interface connector. The interface connector may include connectors for signals needed for the data transfer. These signals may include address, data, and control signals for the volatile memory 114. They may also include bus control signals to allow communication between the main processor 112 and the transfer processor in the data save circuit 120. The non-volatile memory 130 may include flash memory such as NAND flash memory devices.

Figure 2:
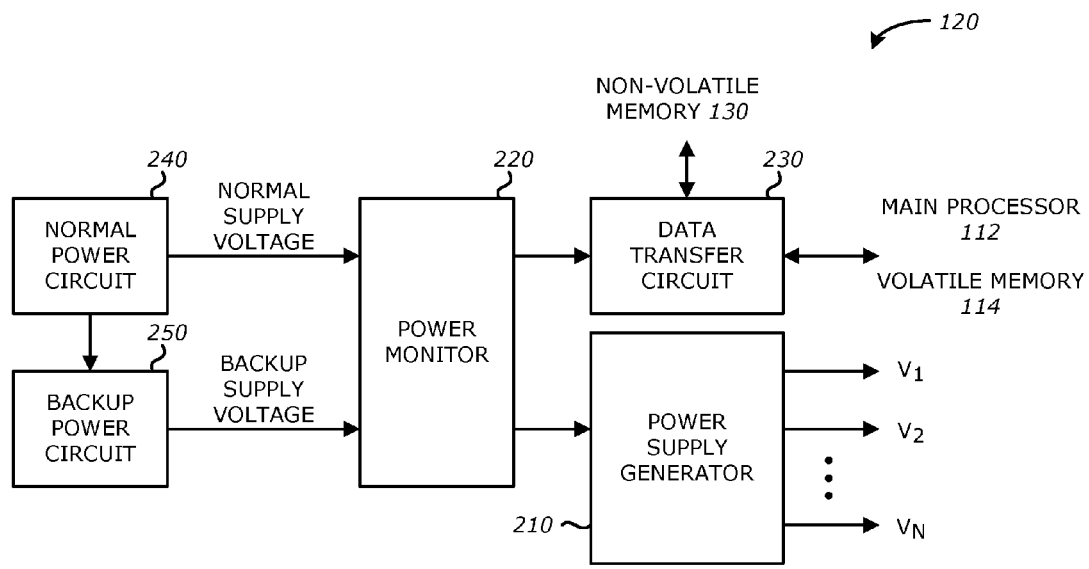
FIG. 2 is a diagram illustrating a data save circuit according to one embodiment.

FIG. 2 is a diagram illustrating a data save circuit 120 according to one embodiment. The data save circuit 120 includes a power supply generator 210, a power monitor 220, a data transfer circuit 230, a normal power circuit 240, and a backup power circuit 250. The data save circuit 120 may include more or less than the above components. For example, the normal power circuit 240 may reside in the main board 110.

The power supply generator 210 generates operating voltages to the circuits in the system from a generator supply source. During normal mode, the generator supply source is the normal supply voltage. During power failure mode, the generator supply source is the backup supply voltage. The circuits that receive the operating voltages may include the volatile memory 114, the data transfer circuit 230, and the non-volatile memory 130. The operating voltages may include a number of different voltage levels $V_1, V_2, \ldots, V_N$, as required by the circuits. In one embodiment, these operating voltages may include 3.3 Volts (V), 1.8V, and 1.3 V. The power supply generator 210 may include one or more voltage regulators that regulate the generator supply source to provide the operating voltages. In one embodiment, the power supply generator 210 may include the triple buck regulator manufactured by Linear Technology (Part number LTC3541) and the boost and buck regulator manufactured by Linear Technology (part number LTC3531).

The power monitor 220 may monitor a normal supply voltage and a backup supply voltage to provide a normal supply voltage to the generator supply source in a normal mode and to provide a backup supply voltage to the generator supply source in a power failure mode. The power monitor 220 may generate a power failure indicator to the data transfer circuit 230 to indicate that a power failure is occurring so that the data transfer circuit 230 may initiate the data transfer.

The data transfer circuit 230 transfers data from the volatile memory 114 in the circuit to the non-volatile memory 130 during the power failure mode. The data transfer circuit 230 receives the power failure indicator from the power monitor 220. The data transfer circuit 230 may communicate with the main processor 112 in the main board 110 in a pre-defined communication protocol to inform the main processor 112 that a power failure is occurring so that the main processor 112 may relinquish the bus to the data transfer circuit 230. When power is restored, the data transfer circuit 230 may also communicate with the main processor 112 so that the main processor 112 may wait for the data transfer circuit 230 to transfer the saved data from the non-volatile memory 130 back to the volatile memory 114. After this transfer is complete, the data transfer circuit 230 may relinquish the bus to the main processor 112 and signal the main processor 112 so that the main processor 112 may resume its normal operation.

The normal power circuit 240 generates the normal supply voltage during the normal mode. It may include appropriate voltage regulator circuit to provide appropriate voltages and currents.

The backup power circuit 250 generates the backup supply voltage that is used during the power failure mode. The backup power circuit 250 may operate continuously during normal mode and power failure mode. During the normal mode, although the backup supply voltage may be generated, but it is not used. In normal mode, the backup supply voltage is less than the normal supply voltage. Only when there is a power failure, the backup supply voltage is used as the generator supply source for the power supply generator 210.

Figure 3:
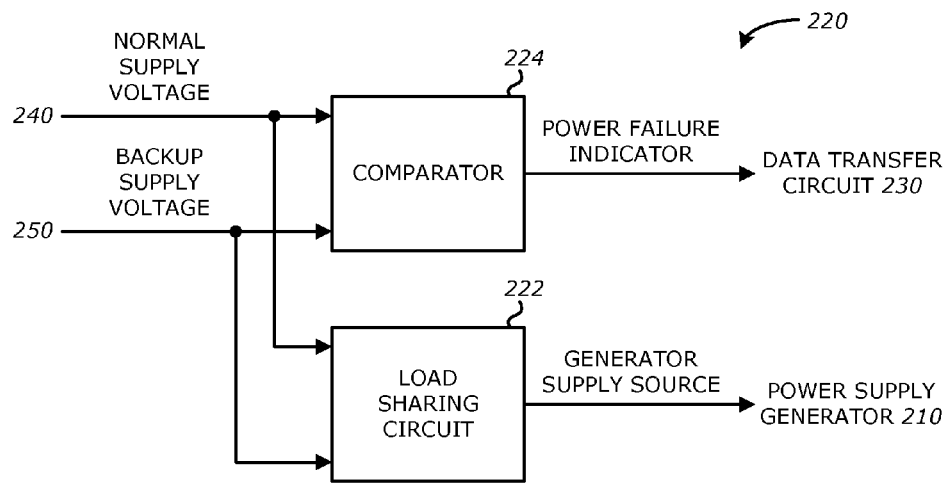
FIG. 3 is a diagram illustrating a power monitor according to one embodiment.

FIG. 3 is a diagram illustrating the power monitor 220 according to one embodiment. The power monitor 220 includes a load sharing circuit 222 and a comparator 224.

The load sharing circuit 222 is essentially an analog OR circuit. It has a first input connected to the normal power circuit 240 that generates the normal supply voltage and a second input connected to the backup power circuit 250 that generates the backup supply voltage. When the normal supply voltage is greater than or equal to the backup supply voltage, the load sharing circuit generates the normal supply voltage. When the normal supply voltage is less than the backup supply voltage, the load sharing circuit generates the backup supply voltage. In one embodiment, the load sharing circuit 222 includes the ideal diodes circuit manufactured by Linear Technology (Part No. LTC4413).

The comparator 224 compares the normal supply voltage and the backup supply voltage and generates, or asserts, a power failure indicator in the power failure mode when the normal supply voltage is less than the backup supply voltage. In one embodiment, the comparator 224 is the micro-power, low voltage, dual comparator manufactured by Linear Technology (Part No. LT6700-2).

Figure 4:
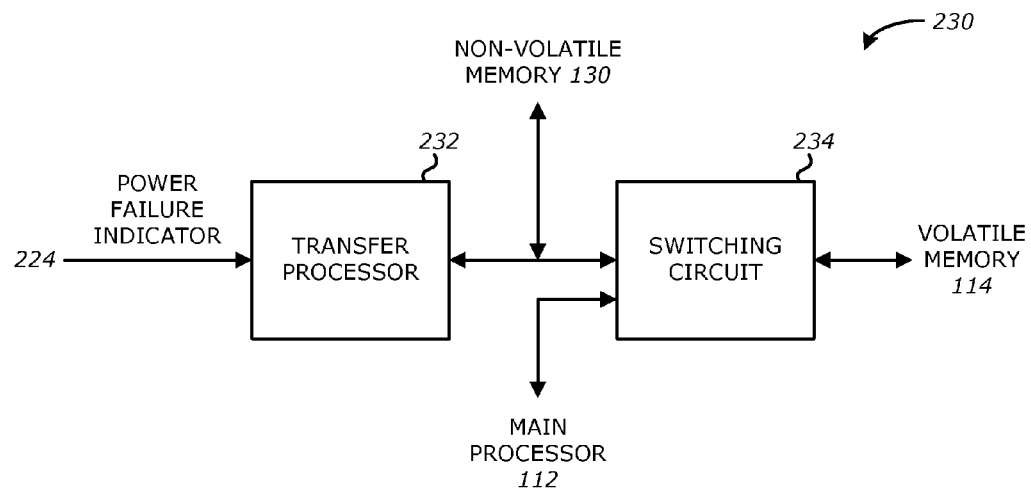
FIG. 4 is a diagram illustrating a data transfer circuit according to one embodiment.

FIG. 4 is a diagram illustrating the data transfer circuit 230 according to one embodiment. The data transfer circuit 230 includes a transfer processor 232 and a switching circuit 234. The data transfer circuit 230 may include more or less than the above components. For example, the transfer processor 232 and the switching circuit 234 may be integrated into one Applications Specific Integrated Circuit (ASIC) to perform the dedicated function of data transfer during power failure.

The transfer processor 232 may be a programmable processor. It may be a microcontroller, a microprocessor, an ASIC, or a digital signal processor (DSP), a Direct Memory Access (DMA) controller, or a media processor. In one embodiment, the transfer processor 232 is the Digital Media System-on-Chip manufactured by Texas Instruments (Part No. TMS320DM355). The transfer processor 232 performs data transfers upon receiving the power failure indicator from the power monitor 220. The power failure indicator may be an interrupt signal that interrupts the transfer processor. In response to this interrupt, the transfer processor 232 may execute a program that carries out the data transfer. Alternatively, the transfer processor 232 may continuously polls the power failure indicator. As soon as the power failure indicator is asserted, the transfer processor begins executing the data transfer program. The data transfer program basically reads the information or contents of the volatile memory and writes the information to the non-volatile memory. The program may also include operations that interact with the main process 112 in the main board 110 for bus switching at the beginning of the power failure mode and when power is restored. The program may also include the generation of control signals to control the switching circuit 234 to switch the bus signals.

The switching circuit 234 is coupled to the transfer processor 232 and the main processor 112 to switch bus signals between the transfer processor 232 and the main processor 112 to and from the volatile memory 114. During the normal mode, the switching circuit 234 switches the bus signals to connect to the main processor 112 for normal system operations. During power failure mode, the switching circuit 234 switches the bus signals to connect to the transfer processor 232 so that the transfer processor 232 can access the volatile memory 114 for data transfers. The switching circuit 234 may include multiplexers for address bus signals and bidirectional transceivers and multiplexers for data bus signals.

The transfer processor 232 has bus interface to the non-volatile memory 130. Since the non-volatile memory 130 is normally not accessible to the main processor 112, there is no need to have switching circuit for the bus signals between the transfer processor 232, the main processor 112 and the non-volatile memory 130.

Figure 5:
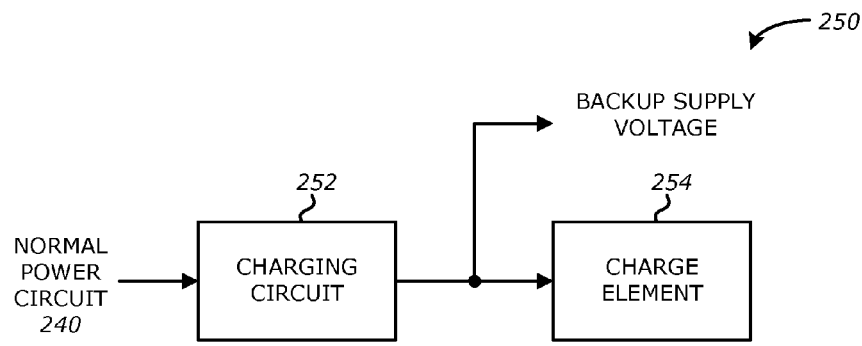
FIG. 5 is a diagram illustrating a backup power circuit according to one embodiment.

FIG. 5 is a diagram illustrating the backup power circuit 250 according to one embodiment. The backup power circuit 250 includes a charging circuit 252 and a charge element 254. The charging circuit 252 receives power from the normal power circuit 240 to provide a charging current to the charge element 254 during the normal mode. In one embodiment, the charging circuit is a synchronous step-up DC/DC converter with input current limit manufactured by Linear Technology (Part No. LTC3125). The charge element 254 receives the charging current and provides the backup supply voltage in the power failure mode. In one embodiment, the charge element 254 includes one or more capacitors. The capacitances of the capacitors are selected such that they can sustain backup supply voltage sufficiently long for the data transfer during the power failure mode. In one embodiment, the charge element includes four capacitors with capacitances 50F connected in parallel. The resulting backup supply voltage ranges from 4.5V to 4.8V.

Figure 6:
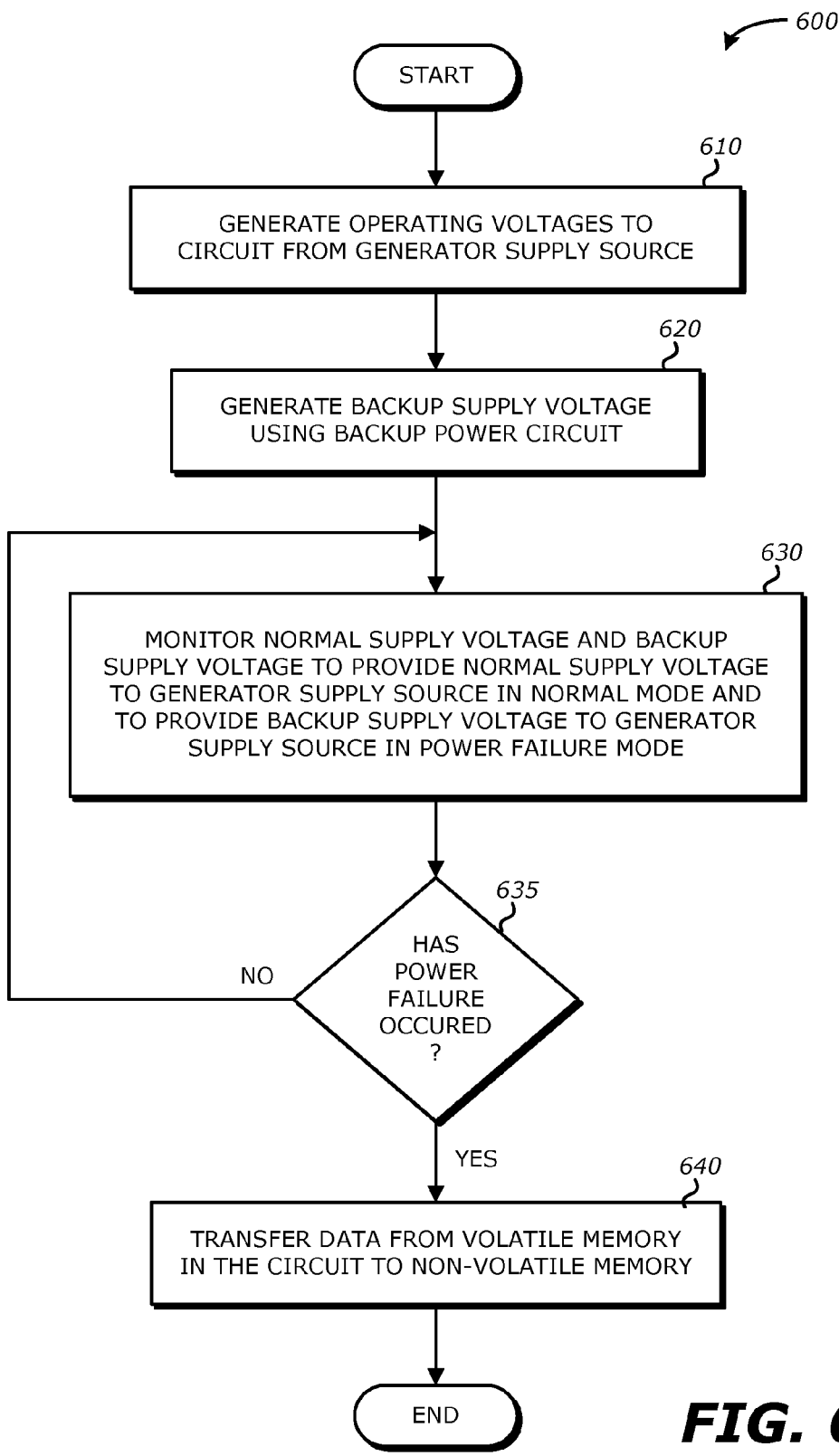
FIG. 6 is a flowchart illustrating a process to provide data saving according to one embodiment.

FIG. 6 is a flowchart illustrating a process 600 to provide data saving according to one embodiment.

Upon START, the process 600 generates operating voltages to a circuit from a generator supply source (Block 610). Next, the process 600 generates a backup supply voltage using a backup power circuit (Block 620). Then, the process 600 monitors a normal supply voltage and a backup supply voltage to provide a normal supply voltage to the generator supply source in a normal mode and to provide a backup supply voltage to the generator supply source in a power failure mode (Block 630). Next, the process 600 determines if a power failure has occurred (Block 635). This may be provided by a power failure indicator from the power monitor as an interrupt signal to the transfer processor. If not, the process 600 continues monitoring the supply voltages and returns to Block 630. Otherwise, the process 600 transfers data from a volatile memory in the circuit to a non-volatile memory during the power failure mode (Block 640). The process 600 is then terminated.

Figure 7:
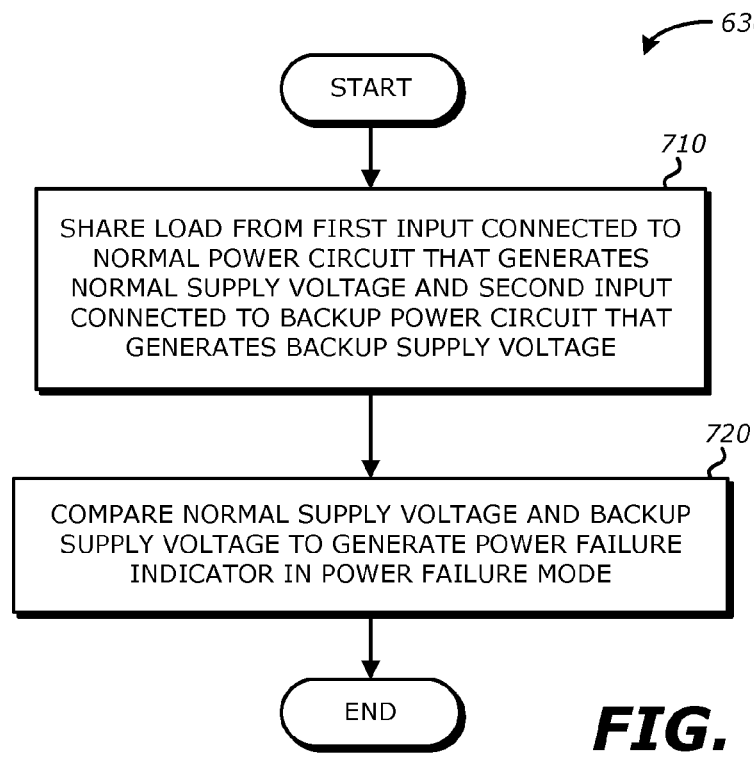
FIG. 7 is a flowchart illustrating a process to monitor according to one embodiment.

FIG. 7 is a flowchart illustrating the process 630 to monitor according to one embodiment.

Upon START, the process 630 shares load from a first input connected to a normal power circuit that generates the normal supply voltage and a second input connected to the backup power circuit that generates the backup supply voltage (Block 710). Next, the process 630 compares the normal supply voltage and the backup supply voltage to generate a power failure indicator in the power failure mode (Block 720). The process 630 is then terminated.

Figure 8:
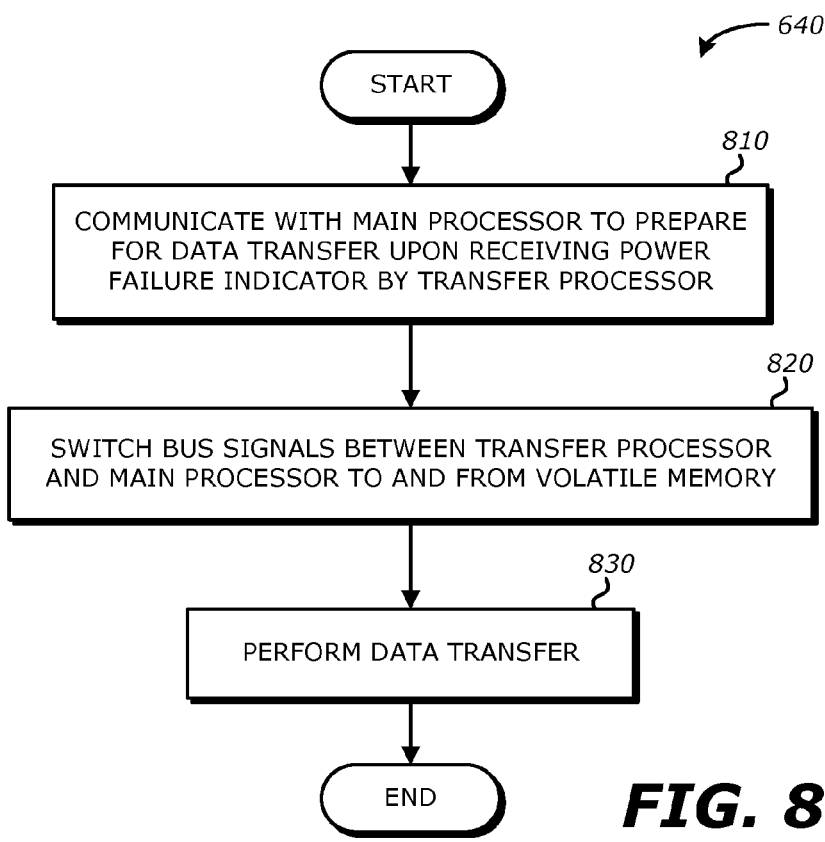
FIG. 8 is a flowchart illustrating a process to transfer data according to one embodiment.

FIG. 8 is a flowchart illustrating the process 640 to transfer data according to one embodiment.

Upon START, the process 640 communicates with a main processor to prepare for data transfer upon receiving the power failure indicator by a transfer processor (Block 810). This may include sending a signal to the main processor, and waiting for the main processor to respond with an acknowledgement. Then, the process 640 switches bus signals between the transfer processor and the main processor to and from the volatile memory (Block 820). Next, the process 640 performs data transfer (Block 830). The process 640 is then terminated.

Figure 9:
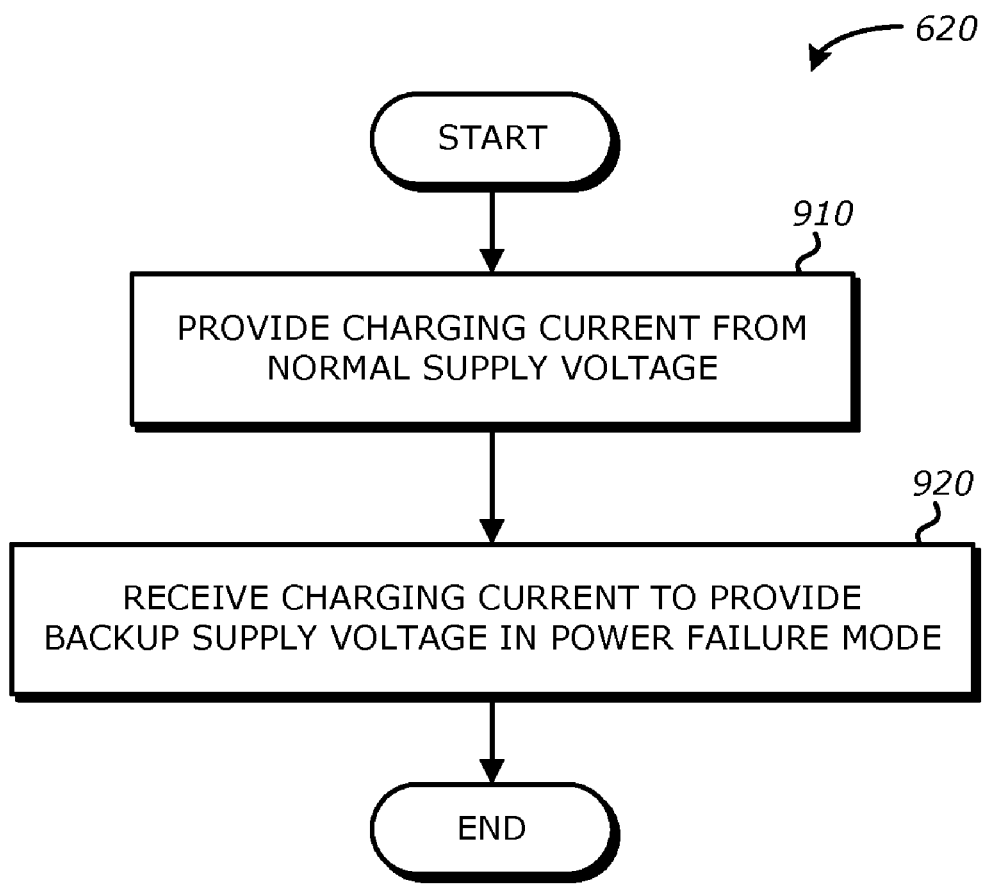
FIG. 9 is a flowchart illustrating a process to generate backup supply voltage according to one embodiment.

FIG. 9 is a flowchart illustrating the process 620 to generate backup supply voltage according to one embodiment.

Upon START, the process 620 provides a charging current from the normal supply voltage (Block 910). This may be performed using a DC/DC converter with current limit. Next, the process 620 receives the charging current to provide the backup supply voltage in the power failure mode (Block 920). This may be performed using a charge element such as capacitors. The process 620 is then terminated.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
   a power supply generator to generate operating voltages to a circuit from a generator supply source;
   a power monitor coupled to the power supply generator to monitor a normal supply voltage and a backup supply voltage to provide the normal supply voltage to the generator supply source in a normal mode and to provide the backup supply voltage to the generator supply source in a power failure mode; and
   a data transfer circuit coupled to the power monitor to transfer data from a volatile memory in the circuit to a non-volatile memory during the power failure mode.

2. The apparatus of claim 1 wherein the normal mode operates when the normal supply voltage is greater than or equal to the backup supply voltage and the power failure mode operates when the normal supply voltage is less than the backup supply voltage.

3. The apparatus of claim 1 wherein the power monitor comprises:
   an OR load sharing circuit having a first input connected to a normal power circuit that generates the normal supply voltage and a second input connected to a backup power circuit that generates the backup supply voltage; and
   a comparator to compare the normal supply voltage and the backup supply voltage, the comparator generating a power failure indicator in the power failure mode.

4. The apparatus of claim 3 wherein the data transfer circuit initiates transferring data from the volatile memory to the non-volatile memory when the power failure indicator is asserted.

5. The apparatus of claim 1 further comprising:
   a backup power circuit coupled to the power monitor to generate the backup supply voltage.

6. The apparatus of claim 5 wherein the backup power circuit comprises:
   a charging circuit coupled to a normal power circuit to provide charging current; and
   a charge element coupled to the charging circuit to receive the charging current, the charge element providing the backup supply voltage in the power failure mode.

7. The apparatus of claim 3 wherein the data transfer circuit comprises:
   a transfer processor to perform data transfers upon receiving the power failure indicator; and
   a switching circuit coupled to the transfer processor and a main processor to switch bus signals between the transfer processor and the main processor to and from the volatile memory.

8. The apparatus of claim 1 wherein the volatile memory includes at least a synchronous dynamic random access memory (SDRAM).

9. The apparatus of claim 8 wherein the SDRAM is a double data rate (DDR), a DDR2, a DDR3, or a DDR4 SDRAM.

10. The apparatus of claim 1 wherein the non-volatile memory includes at least a flash memory.

11. A method comprising:
   generating operating voltages to a circuit from a generator supply source;
   monitoring a normal supply voltage and a backup supply voltage to provide the normal supply voltage to the generator supply source in a normal mode and to provide the backup supply voltage to the generator supply source in a power failure mode; and
   transferring data from a volatile memory in the circuit to a non-volatile memory during the power failure mode.

12. The method of claim 11 wherein the normal mode operates when the normal supply voltage is greater than or equal to the backup supply voltage and the power failure mode operates when the normal supply voltage is less than the backup supply voltage.

13. The method of claim 11 wherein monitoring comprises:
   OR load sharing from a first input connected to a normal power circuit that generates the normal supply voltage and a second input connected to a backup power circuit that generates the backup supply voltage; and
   comparing the normal supply voltage and the backup supply voltage to generate a power failure indicator in the power failure mode.

14. The method of claim 13 wherein transferring comprises initiating transferring data from the volatile memory to the non-volatile memory when the power failure indicator is asserted.

15. The method of claim 11 further comprising:
   generating the backup supply voltage using a backup power circuit.

16. The method of claim 15 wherein generating the backup supply voltage comprises:
   providing a charging current from the normal supply voltage; and
   receiving the charging current to provide the backup supply voltage in the power failure mode.

17. The method of claim 13 wherein transferring data comprises:
   switching bus signals between the transfer processor and a main processor to and from the volatile memory; and
   performing data transfers upon receiving the power failure indicator by a transfer processor.

18. The method of claim 11 wherein the volatile memory includes at least a synchronous dynamic random access memory (SDRAM).

19. The method of claim 18 wherein the SDRAM is a double data rate (DDR), a DDR2, a DDR3, or a DDR4 SDRAM.

20. The method of claim 11 wherein the non-volatile memory includes at least a flash memory.

21. A board assembly comprising:
   a main board having a main processor; and
   a data save circuit coupled to the main board comprising:
      a power supply generator to generate operating voltages to a circuit from a generator supply source,
      a power monitor coupled to the power supply generator to monitor a normal supply voltage and a backup supply voltage to provide the normal supply voltage to the generator supply source in a normal mode and to provide the backup supply voltage to the generator supply source in a power failure mode, and
      a data transfer circuit coupled to the power monitor to transfer data from a volatile memory in the circuit to a non-volatile memory during the power failure mode.

22. The board assembly of claim 21 wherein the normal mode operates when the normal supply voltage is greater than or equal to the backup supply voltage and the power failure mode operates when the normal supply voltage is less than the backup supply voltage.

23. The board assembly of claim 21 wherein the power monitor comprises:
   an OR load sharing circuit having a first input connected to a normal power circuit that generates the normal supply voltage and a second input connected to a backup power circuit that generates the backup supply voltage; and
   a comparator to compare the normal supply voltage and the backup supply voltage, the comparator generating a power failure indicator in the power failure mode.

24. The board assembly of claim 23 wherein the data transfer circuit initiates transferring data from the volatile memory to the non-volatile memory when the power failure indicator is asserted.

25. The board assembly of claim 21 further comprising:
   a backup power circuit coupled to the power monitor to generate the backup supply voltage.

26. The board assembly of claim 25 wherein the backup power circuit comprises:
   a charging circuit coupled to a normal power circuit to provide charging current; and
   a charge element coupled to the charging circuit to receive the charging current, the charge element providing the backup supply voltage in the power failure mode.

27. The board assembly of claim 23 wherein the data transfer circuit comprises:
   a transfer processor to perform data transfers upon receiving the power failure indicator; and
   a switching circuit coupled to the transfer processor and a main processor to switch bus signals between the transfer processor and the main processor to and from the volatile memory.

28. The board assembly of claim 21 wherein the volatile memory includes at least a synchronous dynamic random access memory (SDRAM).

29. The board assembly of claim 28 wherein the SDRAM is a double data rate (DDR), a DDR2, a DDR3, or a DDR4 SDRAM.

30. The board assembly of claim 21 wherein the non-volatile memory includes at least a flash memory.

* * * * *